United States Patent
Sasaki

(10) Patent No.: US 6,476,571 B1
(45) Date of Patent: Nov. 5, 2002

(54) MULTIPLE POWER SOURCE SYSTEM AND APPARATUS, MOTOR DRIVING APPARATUS, AND HYBRID VEHICLE WITH MULTIPLE POWER SOURCE SYSTEM MOUNTED THEREON

(75) Inventor: Shoichi Sasaki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/519,585

(22) Filed: Mar. 6, 2000

(30) Foreign Application Priority Data

Mar. 11, 1999 (JP) .......................................... 11-064381
May 21, 1999 (JP) .......................................... 11-140949

(51) Int. Cl.[7] ................................................ H02P 1/00
(52) U.S. Cl. ...................... 318/139; 318/245; 318/254; 318/138; 320/32; 320/40; 320/64; 322/46; 322/28; 322/90; 322/94; 180/65.1; 180/65.2; 307/64; 307/66
(58) Field of Search ................................. 318/139, 245, 318/254; 320/32, 17, 40, 64; 322/46, 28, 90, 94; 180/65.1; 307/64, 66

(56) References Cited

U.S. PATENT DOCUMENTS

| | | | | |
|---|---|---|---|---|
| 3,624,480 A | * | 11/1971 | Campbell et al. | .............. 320/15 |
| 4,047,088 A | * | 9/1977 | Himmler | ........................ 320/6 |
| 4,308,492 A | * | 12/1981 | Mori et al. | .................... 320/32 |
| 4,492,912 A | * | 1/1985 | Nowakowski | ................. 320/6 |

(List continued on next page.)

FOREIGN PATENT DOCUMENTS

| | | | | |
|---|---|---|---|---|
| DE | 198 57 645 | | 6/1999 | |
| DE | 198 57 645 A1 | * | 6/1999 | ............. H02P/7/36 |
| JP | 2-168802 | | 6/1990 | |
| JP | 8-331705 | | 12/1996 | |
| JP | 08331705 A | | 12/1996 | ........... B06L/11/18 |
| JP | 11-178114 | | 7/1999 | |

OTHER PUBLICATIONS

J. Takehara, et al., International Electric Vehicle Symposium, vol. Symp. 13, pp. 190–197, "Series Conjunction of Ultracapacitors and Batteries for Load Leveling of EV Batteries," Oct. 13, 1996.

*Primary Examiner*—Robert E. Nappi
*Assistant Examiner*—Tyrone Smith
(74) *Attorney, Agent, or Firm*—Oblon, Spivak, McClelland, Maier & Neustadt, P.C.

(57) ABSTRACT

In a multiple power source system of the present invention that has an inverter connected to a reactance, such as three-phase coils in a motor, a high voltage battery is connected with a low voltage battery via one transistor (Tr2) and one diode (D2) included in the inverter and one phase coil (U-phase coil) of the three-phase motor. The transistor Tr2 is turned on to make the electric current flow from the low voltage battery to the U-phase coil. The transistor Tr2 is subsequently turned off at a preset timing, so that the electric energy accumulated in the reactance, that is, the U-phase coil, flows through the diode D1 into the high voltage battery and thereby charges the high voltage battery. This arrangement enables the charging process from the low voltage battery to the high voltage battery without any complicated circuit structure for the voltage step-up. The three-phase motor may be unipolar driven with transistors connected to one side of the inverter. The arrangement of the present invention does not require any complicated structure, which undesirably increases the size of the multiple power source system, in order to ensure mutual supplement of the electric energy between electric systems having a large difference in voltage, for example, an electric system for driving a hybrid vehicle and an electric system for its control circuit.

15 Claims, 8 Drawing Sheets

U.S. PATENT DOCUMENTS 4,686,442 A * 8/1987 Radomski .................... 320/17
4,720,645 A * 1/1988 Stroud ...................... 310/68 D
4,748,395 A * 5/1988 Reynolds .................... 320/17
5,486,747 A * 1/1996 Welch ........................ 318/811
5,656,922 A * 8/1997 La Velle et al. ............... 322/46
5,915,488 A * 6/1999 Fliege ....................... 180/65.2
6,066,928 A * 5/2000 Kinoshita ................... 318/139

* cited by examiner

MULTIPLE POWER SOURCE SYSTEM AND APPARATUS, MOTOR DRIVING APPARATUS, AND HYBRID VEHICLE WITH MULTIPLE POWER SOURCE SYSTEM MOUNTED THEREON

BACKGROUND OF THE INVENTION

1. Field of the Invention

The present invention relates to a multiple power source system that includes both a high tension electric system driven by high tension electric energy and a low tension electric system driven by lower tension electric energy. More specifically the invention pertains to a multiple power source system that compensates for an insufficiency of electric energy in a certain electric system, as well as to an apparatus and a vehicle with the multiple power source system mounted thereon.

2. Description of the Related Art

Electric energy is usable in a wide range of technical fields including thermal, optical, power-driven, and data communication, and is used as the energy power source of various industries. Each apparatus utilizing the electric energy has predetermined ratings and ensures the normal operations under predetermined rated voltage and power. A typical industrial apparatus includes a plurality of devices having different rated voltages and a plurality of power sources having different line voltages for these devices. By way of example, an electric vehicle has a high voltage motor used for driving the vehicle and a low tension electric system used for, for example, a computer, which controls the output torque of the motor, lamps, controllers, and auxiliary machines.

With the advance of semiconductor technology, the use of semiconductor elements, such as power transistors and thyristors, desirably simplifies the structure of a power converter unit like an inverter, a converter, or a chopper circuit. These power converters are controlled with a high accuracy by the computer. The recently developed industrial apparatus includes a charge-discharge unit that enables charge and discharge of electric energy, for example, a battery or a power capacitor, as at least one of the plural power sources. For the purpose of energy saving, non-required mechanical energy is regenerated as electric energy and charged into the charge-discharge unit. An auxiliary power source is provided as a back-up power source in the case of a failure of the main power source.

In the apparatus having the plurality of power sources, contacts and diodes are generally required to connect the plurality of power sources with the devices. This makes the structure of the apparatus rather complicated. For example, a device with a contact, such as a relay, is required to selectively connect a power source of interest with an actuator. A diode having the rectifying function may be used to prevent the electric current from flowing from the high voltage power source to the low voltage power source. The structure of switching the relay or another contact may be replaced with a structure having duplicate motor windings, where each coil is independently connected to the power source. These structures, however, make the apparatus undesirably bulky.

The apparatus having the plurality of power sources may not work properly when either one of the high voltage power source and the low voltage power source has an insufficiency of electric power. In order to solve this problem, a voltage step-up and step-down circuit is provided to enable the electric energy to be supplied to the electric system having an insufficiency of electric energy. This structure enables one electric system having sufficient electric energy to give the excess electric energy to another electric system having insufficient electric energy This effectively reduces the possible malfunction of the industrial apparatus.

In this case, however, a separate circuit is required to step up and down the voltage between the plurality of power sources. This undesirably increases the required number of electric parts and makes the power source circuit rather complicated, thereby increasing the manufacturing cost and lowering the reliability. The voltage step-up and step-down circuit uses a reactor for converting the electric energy to magnetic energy and reconverting the magnetic energy to electric energy. A large reactor is required to accumulate a sufficiently large magnetic energy. Even the step-up and step-down circuit, which is provided only for the emergency purpose to compensate for the insufficient electric power in a power source system, thus occupies a relatively large space and increases the total weight of the industrial apparatus.

SUMMARY OF THE INVENTION

The object of the present invention is thus to simplify the structure of a multiple power source system having a plurality of power sources for driving a three-phase motor, and also to simplify the structure of an apparatus, for example, a hybrid vehicle, with the multiple power source system mounted thereon.

At least part of the above and the other related objects is attained by a multiple power source system that supplies an electric power to a three-phase motor, which has Y-connected windings. The multiple power source system includes: a first direct current power source; a power control circuit that is disposed between the first direct current power source and the Y-connected windings of the three-phase motor and has switching elements, which are switched on and off to supply an electric power output from the first direct current power source to the three-phase motor; and a second direct current power source that is different from the first direct current power source. In the multiple power source system, one terminal of the second direct current power source is connected with a terminal of the first direct current power source having an identical polarity. The other terminal of the second direct current power source is connected with a neutral point of the Y-connected windings in the three-phase motor.

The multiple power source system of the present invention enables the two direct current power sources to be connected with each other by a simple arrangement of connection without using any contacts or diodes.

The multiple power source system of the present invention has a variety of possible applications. In accordance with one possible application, the first direct current power source is chargeable with a higher voltage than the second direct current power source. The multiple power source system of this application further includes a charge unit that controls switch-on and -off operations of a specific switching element, which is connected to a specific winding selected among the Y-connected windings of the three-phase motor, so as to step up a voltage using the specific winding, thereby causing the first direct current power source to be charged with an electric power output from the second direct current power source. This arrangement significantly simplifies the structure of charging the first direct current power source with the second direct current power source. This accordingly reduces the size and the manufacturing cost of the whole system and improves the reliability. This structure does not require any semiconductor elements or reactors (windings) for the voltage step-up circuit.

In the multiple power source system of the present invention, the windings of the three-phase motor and the switching elements of the power control circuit are utilized as the constituents of the voltage step-up circuit of the charge unit. This ensures the effective use of the electric parts.

In accordance with one preferable embodiment of the present invention, the power control circuit includes a pair of the switching elements that are provided for each of the windings of the three-phase motor and are interposed between a positive power line and a negative power line of the first direct current power source. Each of the switching elements is connected with a protection diode. A connection point of each pair of the switching elements is connected to the corresponding winding. The charge unit switches on a switching element that is selected among the pairs of the switching elements and is included in a closed circuit including the second direct current power source and the corresponding winding, and subsequently turns off the selected switching element, so as to cause the first direct current power source to be charged via the protection diode. This arrangement simplifies the structure of the voltage step-up circuit.

In one preferable structure of the above application, the multiple power source system has a charge sensor that measures a charge level of the first direct current power source by the charge unit, and a charge control circuit that controls a working condition of the charge unit, based on the observed charge level by the charge sensor. This circuit structure enables the electrical energy to be automatically supplemented for the direct current power source having an insufficient level of the remaining charge.

In accordance with one embodiment of this structure, the charge control circuit includes a detection unit that detects a charging state of the first direct current power source, based on the observed charge level by the charge sensor; and a working condition determination unit that determines the working condition of the charge unit, based on a result of the detection by the detection unit. This structure enables the charging operation of the charge unit to be automatically concluded. The charge sensor may directly measure the charge and/or discharge electric current of the charge unit, so as to determine the charge level of the first direct current power source by the charge unit. The charge sensor may alternatively estimate the charge level indirectly from a working condition of an apparatus that is driven with the charge unit as the power source. It is preferable that the working condition determination unit, which determines the working condition of the charge unit, not only controls a start and a termination of the charging operation of the charge unit, but regulates the step-up voltage or the step-down voltage of the charge unit, in order to prevent an excessive load from being applied to the charge unit. For example, when the charge unit is a voltage step-up and step-down chopper circuit, the working condition determination unit regulates the duty ratio of a semiconductor switching element included in the chopper circuit, thereby readily regulating the step-up voltage or the step-down voltage of the charge unit.

In accordance with another preferable application of the present invention, the multiple power source system further includes: a connection switching unit that switches a connection of a circuit including the second direct current power source and the neutral point of the Y-connected windings between a substantially closed state and an open state; and a connection control unit that, when the charge unit starts working, drives the connection switching unit to set the connection of the circuit including the second direct current power source and the neutral point of the Y-connected windings in the substantially closed state.

It is preferable that one of the plural direct current power sources used for a control circuit, such as a computer, is grounded or electromagnetically shielded for the noise reduction. In some cases, it may be preferable that the other power source is kept in a floating state. Only when a supplement of electric energy is required, these plural direct current power sources are connected with each other. Otherwise the power sources are substantially kept in the insulating state (including the state of the high impedance).

It is preferable that the first direct current power source is either a battery or a high-power capacitor. The battery may be any one of known secondary batteries that utilize electrochemical reactions to accumulate the electric energy, for example, lead acid batteries, nickel hydrogen batteries, nickel cadmium batteries, lithium ion batteries, and lithium polymer batteries. The secondary battery enables the storage of electric power for a relatively longer time period than a conventional capacitor. An example of the high-power capacitor is an double electric layer capacitor. The capacitor has the self discharge property and is generally required charging in use. The electric system utilizing a power capacitor accordingly requires a charging circuit to charge the power capacitor. The structure of the multiple power source system of the present invention may be utilized as this charging circuit. In the system that has a separate charging circuit for the high-power capacitor, the structure of the multiple power source system of the present invention may be used in the case of malfunction of the separate charging circuit or in the case of an insufficiency of the electric energy.

In the circuit structure that performs charging, the three-phase motor may have Δ-connected windings, in place of the Y-connected windings. In this case, the other terminal of the second direct current power source is connected to one terminal of the Δ-connected windings, in place of the neutral point of the Y-connected windings. The first direct current power source is chargeable with a higher voltage than the second direct current power source. The multiple power source system of this application further includes a charge unit that controls switch-on and -off operations of a specific switching element that is connected to a specific winding, to which the other terminal of the second direct current power source is not directly connected, in order to step up a voltage using the specific winding of the three-phase motor, thereby causing the first direct current power source to be charged with an electric power output from the second direct current power source. In the case of the Δ-connection, one of the windings can not be used for the voltage step-up, but otherwise the Δ-connection ensures a similar voltage step-up circuit to that of the Y-connection.

In the circuit structure that utilizes the windings of the three-phase motor, the Y-connection enables any of the windings to be used for the voltage step-up and charging. In the case of the three-phase motor, there are three charging circuits that respectively utilize the three windings. In the case of the Δ-connection, the windings, to which the other terminal of the second direct current power source is not directly connected, may be used for the voltage step-up. There are thus still duplicate charging circuits. The multiple charging circuits enable the voltage step-up and charging process, which requires a certain time period, to be carried out by utilizing the plurality of windings, thereby shortening the required charging time. This structure also enables the three-phase magnetic circuits utilizing the respective windings to be used equally.

The multiple power source system of the present invention may be incorporated in a variety of apparatuses, and is effectively used, for example, in a structure that has a starting motor, which is driven only at the time of staring to start an engine, in one of the power systems. In a typical structure of the apparatus having an engine that is driven directly with a fuel, once the engine starts, a generator is driven to supply the required electric power. In this structure, it is required to supply the electric power for driving the starting motor only at the time of starting the engine. The charge unit is driven to accumulate the electric energy required for the starting operation in the battery or in the high-power capacitor, and the engine is started with the accumulated electric energy. The charging time is practically shortened when the charge unit is driven to accumulate only the electric energy required for the starting operation in the battery or in the high-power capacitor. Examples of the apparatus having this structure include a hybrid vehicle with both an internal combustion engine and a motor mounted thereon to drive the vehicle, and a vehicle with a motor for a compressor, which is a power source of an air conditioner mounted on the vehicle and requires a large electric energy only at a starting time.

The present invention is also directed to a motor driving apparatus that utilizes the multiple power source system. In the multiple power source system, the three-phase motor can be unipolar driven by means of a closed circuit including the second direct current power source, a selected switching element, and the corresponding winding. The motor driving apparatus may include: a first motor drive unit that causes the power control circuit to drive the three-phase motor by means of the first direct current power source; and a second motor drive unit that independently switches on and off the switching elements that are connected to power lines of the connection of the first direct current power source with the second direct current power source, and unipolar driving the three-phase motor by means of the second direct current power source. In this application, the second motor drive unit uses the second direct current power source to make the electric current flow through each winding of the three-phase motor. This enables the three-phase motor to be unipolar driven.

In accordance with one preferable embodiment of the motor driving apparatus, the power control circuit includes a pair of the switching elements that are provided for each of the windings of the three-phase motor and are interposed between a positive power line and a negative power line of the first direct current power source. A connection point of each pair of the switching elements is connected to the corresponding winding. The second motor drive unit successively switches on and off one of each pair of the switched elements to form a closed circuit including the second direct current power source and the corresponding winding, thereby generating a field in the three-phase motor.

In the motor driving apparatus, the three-phase motor may have Δ-connected windings, in place of the Y-connected windings. In this case, the other terminal of the second direct current power source is connected to one terminal of the Δ-connected windings, in place of the neutral point of the Y-connected windings. The motor driving apparatus includes: a first motor drive unit that causes the power control circuit to drive the three-phase motor by means of the first direct current power source; and a second motor drive unit that independently switches on and off switching elements, to which the other terminal of the second direct current power source is not directly connected, among the switching elements that are connected to power lines of the connection of the first direct current power source with the second direct current power source, and irregular unipolar driving the three-phase motor by means of the second direct current power source. In this structure, all the windings of the three-phase motor can not be used, but two phase windings can be used to drive the three-phase motor.

The motor driving apparatus of the present invention may be applied to a vehicle with an engine, which is directly driven with a fuel, mounted thereon as one of the drive sources. In such a vehicle, the three-phase motor is connected with either one of a drive shaft of the vehicle and a rotating shaft of the engine. The drive shaft is driven according to a driving state of the vehicle with at least one of a power output from the engine and a power output from the three-phase motor.

The multiple power source system of the present invention is not restricted to the applications discussed above, but there may be a variety of other applications. There may be a plurality of three-phase motors having windings and a plurality of charge units. In the multiple power source system of the present invention, multiple charging circuits laid out in a multi-layer configuration may be constructed by utilizing the windings of the plural three-phase motors and the plural charge units. In the case of m-layer, n-multiple charging circuits, the accumulated charge is carried out with n output electric currents having the phases shifted by $2\pi/n$ at an identical on-time ratio having the electrical angle shifted by $2\pi/m$.

The multiple power source system may additionally include known electric elements. For example, when the direct current power source has a significantly large inductance, a low-pass filter may be added to prevent the switching properties of the switching elements from being worsened by the large inductance. The reactance, the capacitor, and the resistor used as the parts of other electric circuits may be used for the electric elements included in the low-pass filter.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
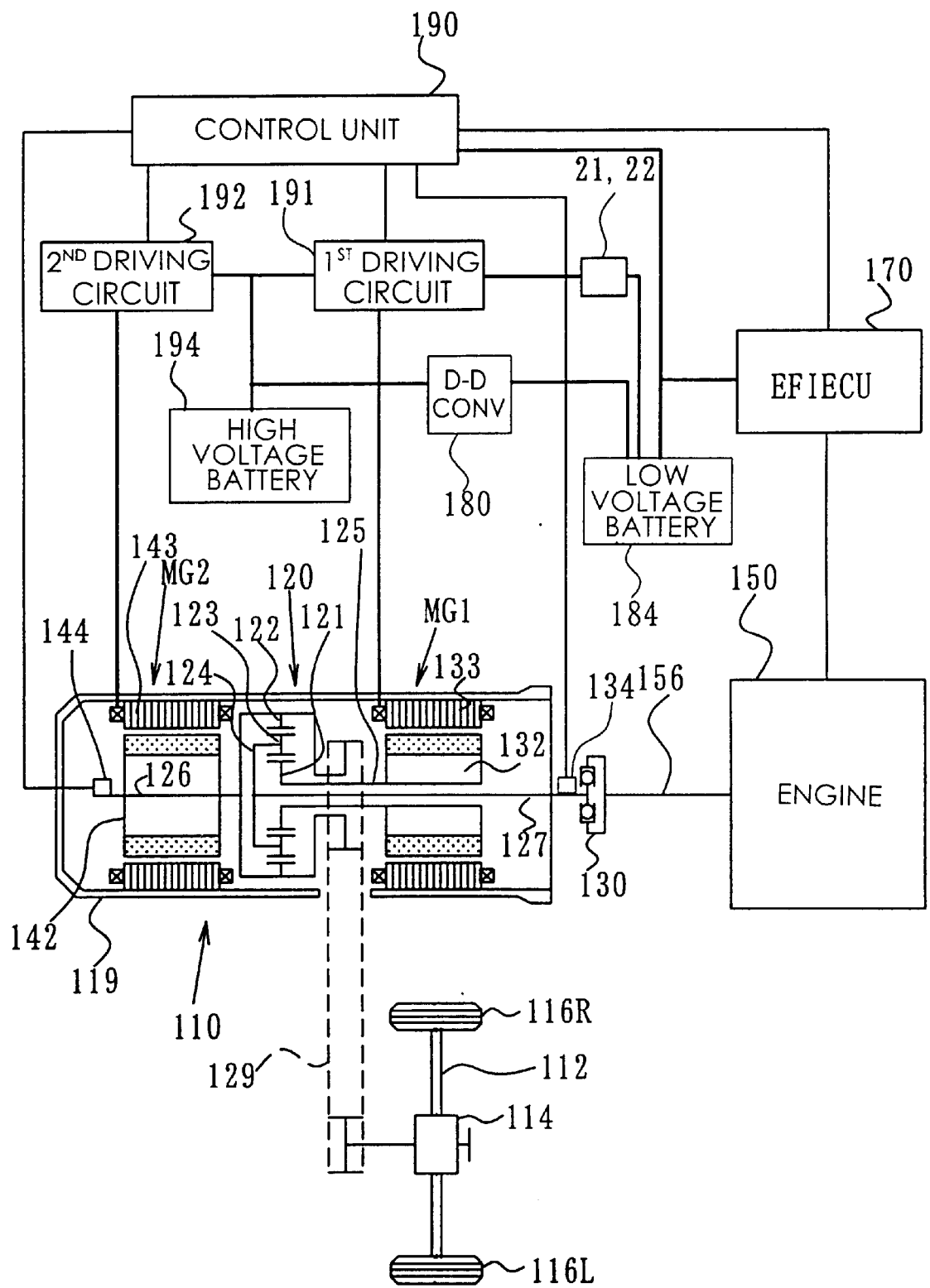
FIG. 1 schematically illustrates the structure of a hybrid vehicle with a multiple power source system mounted thereon in a first embodiment according to the present invention.

FIG. 1 schematically illustrates the structure of a hybrid vehicle with a multiple power source system mounted thereon in a first embodiment according to the present invention. The hybrid vehicle means a vehicle with both an engine and a motor mounted thereon. The hybrid vehicle shown in FIG. 1 has a structure of enabling the power of the engine to be directly transmitted to drive wheels as described below. The hybrid vehicle of this arrangement is referred to as the parallel hybrid vehicle.

(1) Fundamental Structure of the Hybrid Vehicle of the Embodiment

The hybrid vehicle of FIG. 1 has an engine 150 driven with gasoline with a fuel and a power conversion output apparatus 110, which includes a first motor MG1, a second motor MG2, and a planetary gear unit 120. The engine 150, the first motor MG1, and the second motor MG2, which all enable the power output, are mechanically linked via the planetary gear unit 120. The planetary gear unit 120 has three rotating shafts respectively connected to gears or constituents of the planetary gear unit 120. The planetary gear unit 120 includes, as its primary constituents, a sun gear 121 rotating on the center, a planetary pinion gear 123 that revolves both round the sun gear 121 and on its axis, and a ring gear 122 that revolves round the planetary pinion gear 123. The planetary pinion gear 123 is supported by a planetary carrier 124.

An engine 150 included in the power system is a conventional gasoline engine and rotates a crankshaft 156. In the hybrid vehicle of the embodiment, the crankshaft 156 of the engine 150 is linked with a planetary carrier shaft 127 via a damper 130. The damper 130 absorbs the torsional vibrations occurring on the crankshaft 156. A rotor 132 of the first motor MG1 is connected to a sung gear shaft 125, whereas a rotor 142 of the second motor MG2 is connected to a ring gear shaft 126. The rotations of the ring gear 122 are transmitted to an axle 112 and wheels 116R and 116L via a chain belt 129 and a differential gear 114. The engine 150 is controlled and driven by the EFIECU 170. The EFIECU 170 is constructed as a one chip microcomputer including a CPU, a ROM, and a RAM. The CPU carries out control operations, such as fuel injection of the engine 150, according to programs stored in the ROM. A variety of sensors representing the driving conditions of the engine 150 are connected to the EFIECU 170 to enable the control operations, although not specifically illustrated in FIG. 1.

The first and the second motors MG1 and MG2 included in the power system are synchronous motor generators. The first motor MG1 includes the rotor 132 with a plurality of permanent magnets attached to the outer circumferential surface thereof and a stator 133 with three-phase coils wound thereon to form a revolving magnetic field. Similarly the second motor MG2 includes the rotor 142 with a plurality of permanent magnets attached to the outer circumferential surface thereof and a stator 143 with three-phase coils wound thereon to form a revolving magnetic field. The stators 133 and 143 are fixed to a casing 119. The three-phase coils wound on the stators 133 and 143 of the motors MG1 and MG2 are connected to a battery 194 respectively via a first driving circuit 191 and a second driving circuit 192. The first driving circuit 191 and the second driving circuit 192 are transistor inverters that have a pair of transistors with regard to each phase as switching elements. Both the first driving circuit 191 and the second driving circuit 192 are connected to a control unit 190. The transistors included in the first and the second driving circuits 191 and 192 are switched on, in response to control signals output from the control unit 190, so that the electric current flows between the battery 194 and the motors MG1 and MG2. Each of the motors MG1 and MG2 may work as a motor that is driven and rotated with a supply of electric power from the battery 194. Hereinafter this driving state is referred to as the power operation. Each of the motors MG1 and MG2 also works as a generator when the corresponding rotor 132 or 142 is rotated by an external force. In this case, the motor MG1 or MG2 generates an electromotive force between ends of the three-phase coils and enables the battery 194 to be charged with the electromotive force. Hereinafter this driving state is referred to as the regenerative operation. The hybrid vehicle of this embodiment drives in a variety of conditions, based on the functions of the planetary gear unit 120. Concrete driving conditions are not specifically described here. A variety of sensors, such as speed sensors 134 and 144, that represent the driving conditions of the power conversion output apparatus 110 are connected to the control unit 190.

(2) Connection of the Electric system of the Embodiment

The following describes two electric systems mounted on this hybrid vehicle. As described previously, the high voltage battery 194, which corresponds to the first direct current power source of the present invention, is mounted on the hybrid vehicle. The high voltage battery 194 is connected to the first and the second motors MG1 and MG2 in such a manner that the electric power is mutually transmitted between the battery 194 and the first and the second motors MG1 and MG2 via the first and the second driving circuits 191 and 192. The high voltage battery 194 outputs a voltage of almost 300 volts. This power source system is hereinafter referred to as the high tension electric system. The hybrid vehicle also has a low tension power source system, that is, a low voltage battery 184, which corresponds to the second direct current power source of the present invention. The low voltage battery 184 is connected to the EFIECU 170 and the control unit 190. The low voltage battery 184 outputs a direct current voltage of approximately 12 volts to the EFIECU 170 and the control unit 190. This power source system is hereinafter referred to as the low tension electric system. The high voltage battery 194 and the low voltage battery 184 are connected with each other via a converter unit 180 for the voltage step-down. When the electric power of the low voltage battery 184 is consumed, for example, by the EFIECU 170 and the remaining charge of the low voltage battery 184 decreases to a predetermined level, the low voltage battery 184 is charged with a supply of electric power output from the high voltage battery 194 via the converter unit 180. The low voltage battery 184 is accordingly kept in the full charge state. Although not specifically illustrated here, the converter unit 180 includes an inverter that converts the direct current into the alternating current, an insulating transformer that steps down the converted alternating voltage, and a converter that is connected to the secondary winding of the insulating transformer and converts the alternating current to the direct current. Namely the high tension electric system is electrically isolated from the low tension electric system, although the low voltage battery 184 and the high voltage battery 194 are connected with each other via the converter unit 180. The high tension electric system is thus kept in a completely floating state, unless contacts of relays 21 and 22 (described below) are set in ON position. This means that the high tension electric system is generally insulated from the vehicle body that is in contact with the human body. The low tension electric system is grounded to the vehicle body, in order to reduce the noise.

The low voltage battery 184 is connected to the first driving circuit 191 and the first motor MG1 via the relays 21 and 22. This arrangement enables the high voltage battery 194 to be charged with the electric power accumulated in the low voltage battery 184 as described below. The high voltage battery 194 is charged with the electric power output from the low voltage battery 184, because of the following reasons. When the engine 150 starts from a stationary state, in which the hybrid vehicle stops and the engine 150 is at a stop, the control unit 190 locks the second motor MG2 and rotates the first motor MG1 with the electric power supplied from the high voltage battery 194. This rotates the planetary carrier shaft 127 of the planetary gear unit 120 and cranks the crankshaft 156. In the event that the high voltage battery 194 is dead, the engine 150 can not be cranked to start. This problem arises when the high voltage battery 194 is fully discharged by some reasons, for example, when the vehicle with the high voltage battery 194 deteriorating with an elapse of time has not been driven for a long time period or when the driver stops the vehicle and turns the ignition key off immediately after a drive on a long upward slope. In this case, the remaining charge of the high voltage battery 194 becomes substantially equal to zero. In the case where the low voltage battery 194 has the remaining electric power, the high voltage battery 194 is charged with the step-up voltage of the remaining electric power. This enables the above starting control with the high voltage battery 194. Once the engine 150 starts, the first motor MG1 is used as the generator to generate the required electric power. The electric power output from the low voltage battery 184 to the high voltage battery 194 is thus required to have only a sufficient level for starting the engine 150.

Figure 2:
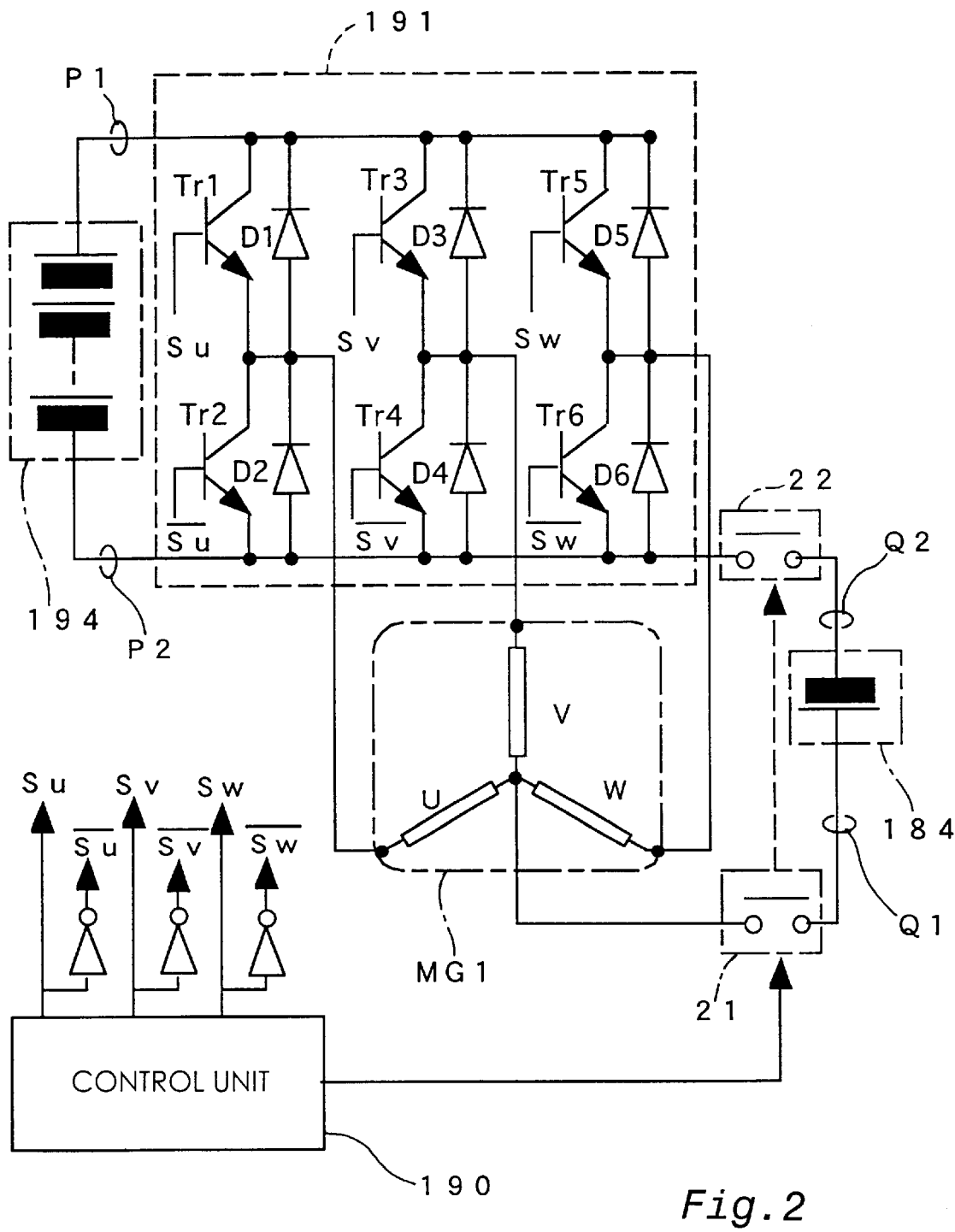
FIG. 2 is a circuit diagram showing an electric circuit of the multiple power source system shown in FIG. 1.

FIG. 2 shows the connection of the high voltage battery 194, the first driving circuit 191, the first motor MG1, the relays 21 and 22, the low voltage battery 184, and the control unit 190. The high voltage battery 194 is also connected with the second driving circuit 192 for the second motor MG2 as shown in FIG. 1, but the connection with the second driving circuit 192 is omitted from the illustration of FIG. 2.

Six transistors Tr1 through Tr6 included in the first driving circuit 191 constitute a transistor inverter and are arranged in pairs to function as a source and a sink with regard to a pair of power lines P1 and P2. The three-phase coils U, V, and W of the first motor MG are respectively connected to nodes of the respective paired transistors Tr1 through Tr6. Diodes D1 through D6 for protection against a counter electromotive force are located between a collector and an emitter of the respective transistors Tr1 through Tr6. The power lines P1 and P2 are connected respectively to a plus terminal and a minus terminal of the high voltage battery 194. The control unit 190 outputs control signal Su, Sv, and Sw and inverted signals thereof to drive the transistors Tr1 through Tr6 included in the first driving circuit 191. The control unit 190 successively regulates the on-time of the paired transistors Tr1 through Tr6 with the control signals Su, Sv, and Sw in the course of the operation of the first motor MG1 (the power operation or the regenerative operation). The electric currents flowing through the three-phase coils U, V, and W of the first motor MG1 are regulated to quasi-sine waves by the known PWM control to have the wave forms mutually shifted by 120 degrees. When the first motor MG1 carries out the power operation, the electric currents flowing through the three-phase coils U, V, and W generate a revolving magnetic field. The rotor 132 with the permanent magnets attached to the outer circumferential surface thereof is thus rotated through the interaction with the revolving magnetic field.

The minus power line P2 of the high voltage battery 194 is connected to a minus power line Q2 of the low voltage battery 184 via the contact of the relay 22. A plus power line Q1 of the low voltage battery 184 is connected to a neutral point of the Y-connected three-phase coils U, V, and W in the first motor MG1 via the contact of the relay 21.

(3) Voltage step-up Control

Figure 3:
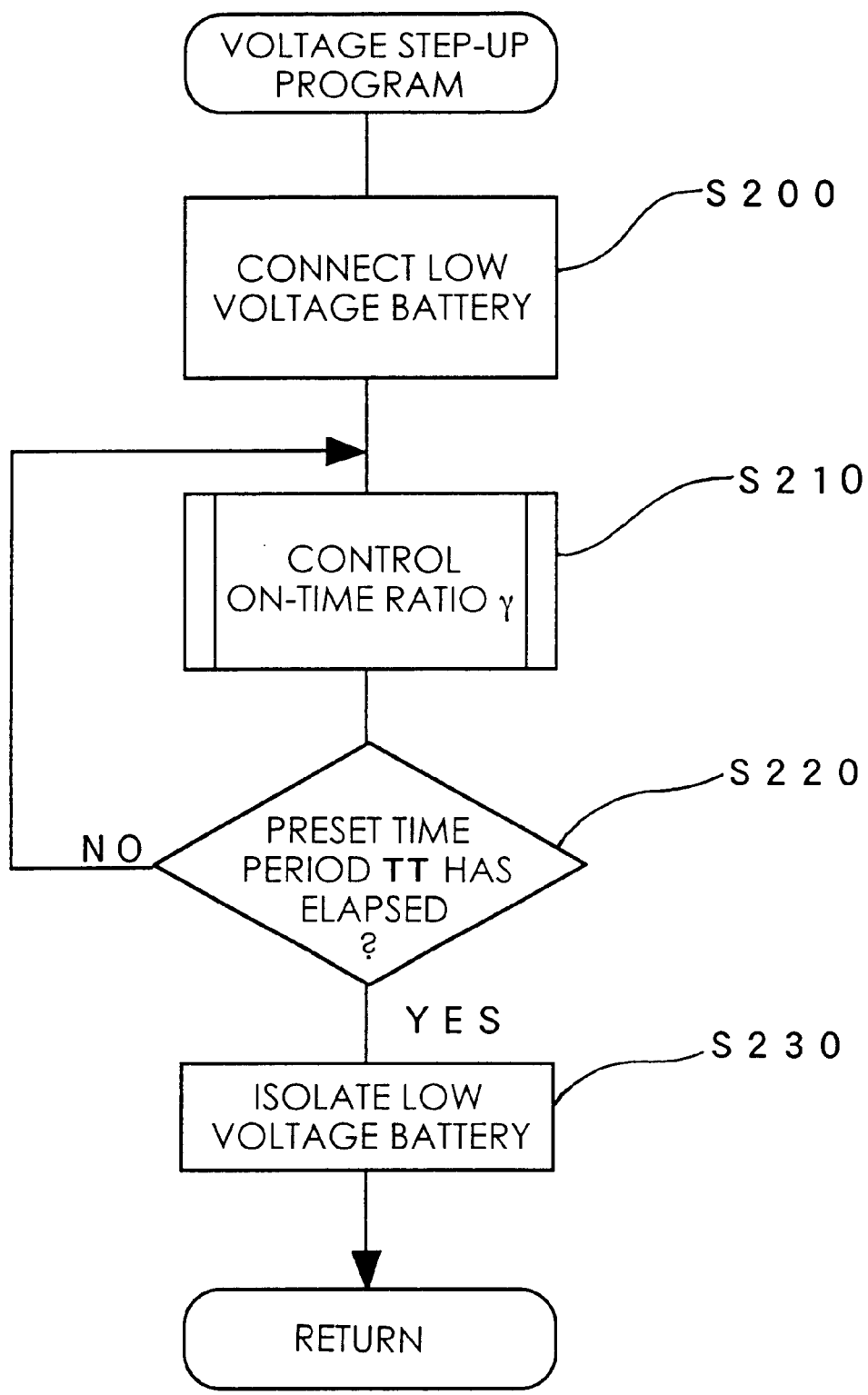
FIG. 3 is a flowchart showing a voltage step-up program executed by the control unit in the first embodiment.

The arrangement of the embodiment discussed above enables the high voltage battery 194 to be charged with the electric power output from the low voltage battery 184. FIG. 3 is a flowchart showing a voltage step-up program that is executed in the process of charging the high voltage battery 194 with the electric power of the low voltage battery 184. At a starting time, the EFIECU 170 and the control unit 190 cause the electric power to be supplied from the high voltage battery 194 to the first motor MG1 via the first driving circuit 191, so as to start the engine 150 by means of the first motor MG1. When this standard operation fails and the failure is ascribed to the excessive discharge of the high voltage battery 194, the voltage step-up program shown in the flowchart of FIG. 3 is initiated. The voltage step-up program first excites the relays 21 and 22 to close their contacts and thereby connect the high tension electric system with the low tension electric system at step S200.

Figure 4:
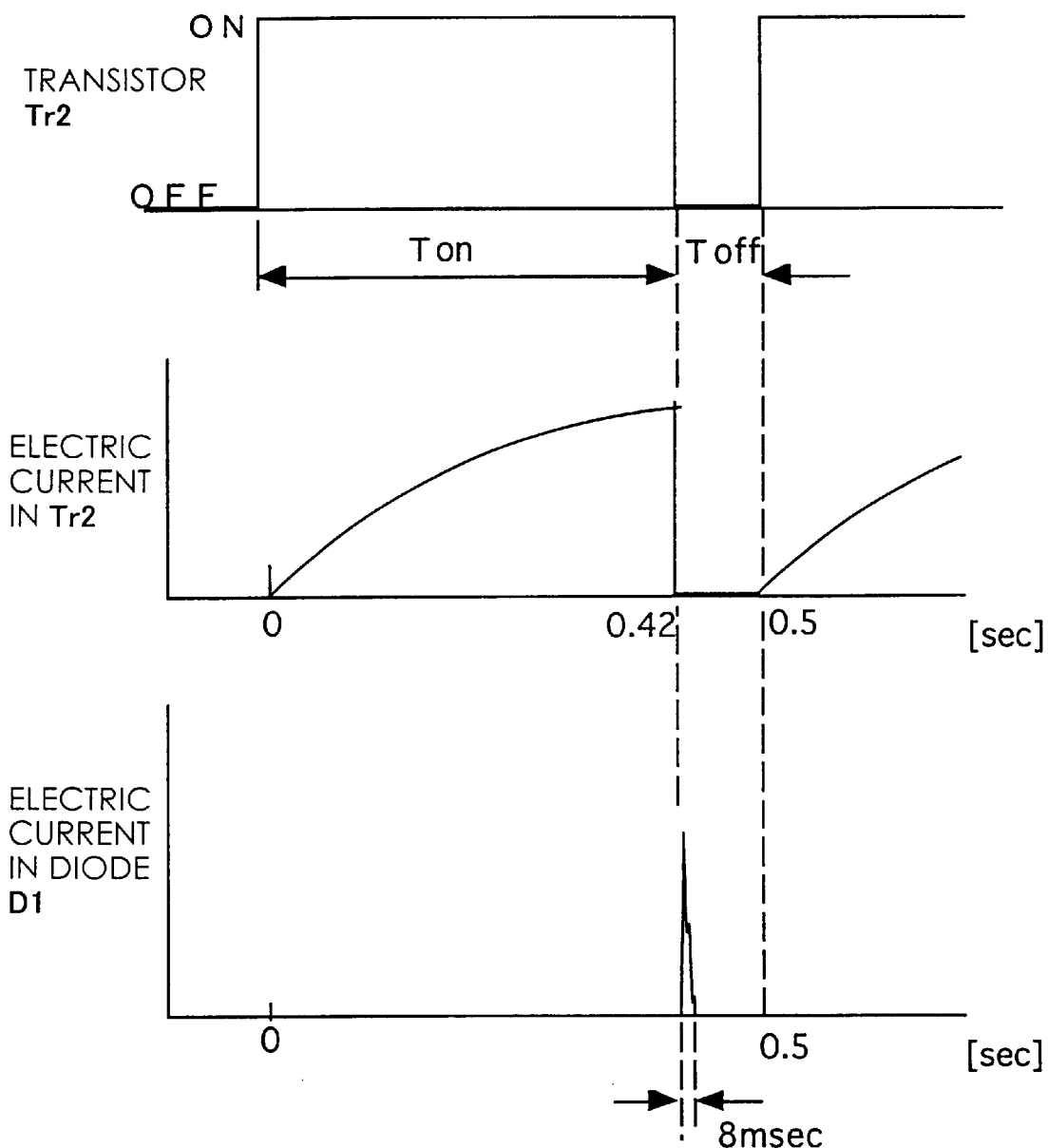
FIG. 4 is graphs showing the waveforms of electric currents in the respective elements in the course of the execution of the voltage step-up program shown in FIG. 3.

The program then outputs a control signal to turn on and off the transistor Tr2 in the first driving circuit 191 at a predetermined on-time ratio γ (=on time Ton/(on time Ton+ off time Toff)) in a period of 0.5[sec]. When the transistor Tr2 is turned on, a closed circuit starting from the low voltage battery 184 and going through the neutral point of the first motor MG1, the U-phase coil of the motor MG1, and the transistor Tr2 to the low voltage battery 184 is formed intermittently at step S210. This gradually increases the electric current flowing from the low voltage battery 184 through the U-phase coil of the first motor MG1. The increasing electric current is accumulated as magnetic energy in the U-phase coil of the first motor MG1. The graphs of FIG. 4 show variations in electric current of the respective elements over a substantially one cycle. When the transistor Tr2 is turned on, the electric current flowing through the transistor Tr2 gradually increases as shown in the graph of FIG. 4. The transistor Tr2 is on in a predetermined on-time, which is equal to 0.42[sec] in this embodiment. The transistor Tr2 is turned off after the elapse of the predetermined on-time. The electric current then instantaneously flows into the high voltage battery 194 via the diode D1 by means of an induced electromotive force with the magnetic energy accumulated in the U-phase coil of the first motor MG1, so as to charge the high voltage battery 194. In the multiple power source system of this embodiment, the U-phase coil, which is one of the armature coils of the first motor MG1, functions as a reactance of the voltage step-up circuit, whereas the diode D1 of the first driving circuit 191 that is constructed as an inverter functions as a protection diode of the voltage step-up circuit.

The repeated on-off operations of the transistor Tr2 in the first driving circuit 191 in response to the control signal output from the control unit 190 repeat the series of processes discussed above. The high voltage battery 194 is thus gradually charged using the low voltage battery 184 as the power source. The control of the transistor Tr2 at the predetermined on-time ratio y continues until a preset time period TT has elapsed. When it is determined at step S220 that the preset time period TT has elapsed, the supply of electricity to the transistor Tr2 is terminated. The preset time period TT corresponds to the quantity of charge into the high voltage battery 194 equal to 10[KJ] as the work in this embodiment. Regulation of the preset time period TT accordingly determines the quantity of charge into the high voltage battery 194. The program subsequently cuts off the excitation to the relays 21 and 22 to open their contacts at step S230. This restores the insulation of the high tension electric system from the low tension electric system. The control procedure then exits from this voltage step-up program and returns to the standard control mode. Since the high voltage battery 194 now has the required electric power, the control unit 190 carries out the control operation to start the engine 150 with the first and the second motors MG1 and MG2.

(4) Effects of the Embodiment

As described above, in the hybrid vehicle of the embodiment, the electric energy is distributed from the low voltage battery 184 of the low tension electric system to the high voltage battery 194 without using any special converter for the voltage step-up. Even if the high voltage battery 194 is excessively discharged to disable the starting operation, the engine 150 can be started using the low voltage battery 184 as the power source. The voltage step-up circuit required for this operation is constructed by utilizing the U-phase coil of the first motor MG1 and the transistor Tr2 and the diode D1 of the first driving circuit 191 provided as the inverter. This arrangement attains a small-size, simple, and inexpensive electric circuit. All the constituents of the voltage step-up circuit except the relays 21 and 22 are the electric parts originally mounted on the hybrid vehicle. This arrangement thus desirably prevents the increase in manufacturing cost due to additional parts as well as the worsened reliability.

In the arrangement of this embodiment, the high tension electric system and the low tension electric system are generally in the insulated state (high impedance connection) and are directly connected with each other via the relays 21 and 22 only at the time of distributing the electric power. This restricts the on-time, when the high tension electric system is electrically connected with the low tension electric system, to a short time and ensures the subsequent restoration to the insulated state.

(5) Possible Modifications

In the description of the first embodiment, the U-phase coil of the first motor MG1 is used as the reactance, in which the electric power for the voltage step-up is accumulated in the form of magnetic energy. Similarly the V-phase coil and the W-phase coil may be used as the reactance. In the case of the V-phase coil, the transistor Tr4 is turned on and off, and the high voltage battery 194 is charged via the diode D3. In the case of the W-phase coil, the transistor Tr6 is turned on and off, and the high voltage battery 194 is charged via the diode D5. The electric current flowing through each phase does not have any contribution to the revolving magnetic field in the first motor MG1. The supply of electricity to each phase coil accordingly does not cause rotation of the first motor MG1. Similarly any of the three-phase coils of the second motor MG2 may also be used as the reactance.

Figure 5:
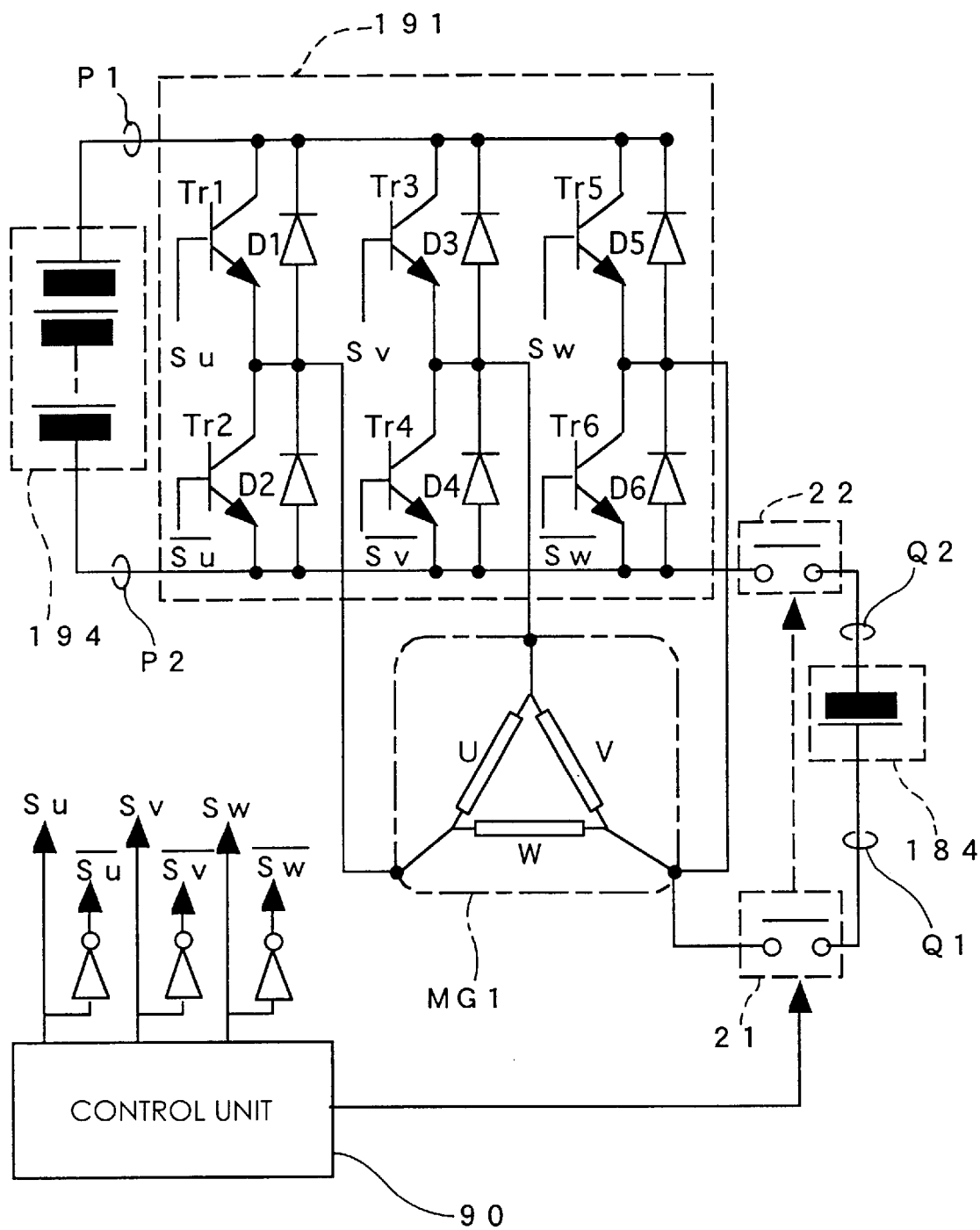
FIG. 5 is a circuit diagram showing a modified circuit structure applied to a motor having Δ-connected three-phase coils.

In the embodiment discussed above, the motor MG1 has the Y-connected three-phase coils. The principle of the present invention is, however, also applicable to the motor MG1 having Δ-connected three-phase coils. In this case, one of the power lines of the low voltage battery 184 should be connected to one end terminal of a certain phase coil as shown in FIG. 5. In the example of FIG. 5, the U-phase coil can thus not be used for the voltage step-up program. But the other phase coils, that is, the V-phase coil and the W-phase coil, may be used as the reactance in the process of the voltage step-up program discussed in the above embodiment.

In the embodiment discussed above, the converter unit 180 is exclusively used to charge the low voltage battery 184 with the high voltage battery 194. The circuit structure described above may alternatively be used to charge the low voltage battery 184 with the electric power of the high voltage battery 194. As an example, the following describes the technique of using the circuit structure shown in FIG. 2. In this case, it is considered that the transistor Tr1 at the positive pole of the U-phase in the first driving circuit 191, the U-phase coil of the first motor MG1, and the low voltage battery 184 are connected in series and constitute a chopper circuit. The on-off duty of the transistor Tr1 is regulated while the contacts of the relays 21 and 22 are closed. The regulation of the on-off duty controls the charge current into the low voltage battery 184, that is, the charging voltage. In this circuit structure, when the transistor Tr1 is on, the voltage output from the high voltage battery 194 is applied to the low voltage battery 184 via the U-phase coil, so as to charge the low voltage battery 184. When the transistor Tr1 is subsequently turned off at a preset timing to make the charge current within a predetermined range, the electric current flows through a circulation path starting from the U-phase coil and going through the low voltage battery 184 and the diode D2 at the negative pole of the U-phase in the first driving circuit 191 (functioning as the flywheel diode) to the U-phase coil. The repeated on-off operations of the transistor Tr1 step down the voltage output from the high voltage battery 194 and cause the low voltage battery 184 to be charged with the step-down voltage. The control unit 190 controls on and off the transistors Tr and enables the low voltage battery 184 to be readily charged with the electric power output from the high voltage battery 194. In this case, the charging voltage is stepped down. The on-time and the off-time of the transistor Tr1 are thus determined according to the rated voltage of the low tension electric system. Compared with the case of charging with the step-up voltage, the on-time and the off-time of the transistor in the case of charging with the step-down voltage are set significantly shorter. There are a variety of other circuit structures applicable to charge the low voltage battery 184 with the electric power output from the high voltage battery 194.

In the embodiment discussed above, the on-off control of the transistor Tr2 is carried out in the preset time period TT according to the flowchart of FIG. 3. The charging energy (the quantity of charge) output from the low voltage battery 184 into the high voltage battery 194 is controlled by regulating the preset time period TT. When a large energy is required to start the engine, for example, in the cold weather, it is preferable that the preset time period TT is extended to allow the adequate control according to the required charging energy. In another preferable structure, a charge sensor is attached to the high voltage battery 194 to measure the actual quantity of charge in the high voltage battery 194. The charge control is carried out according to the observed quantity of charge. The charge sensor used here may be a sensor that directly measures the specific gravity of the battery. The quantity of charge may be calculated from the observed electric current flowing into the high voltage battery 194 and the observed terminal voltage, instead of being directly measured with the charge sensor. A current sensor and a voltage sensor are generally provided to make the driving circuit 191 function as the inverter and may be used to determine the charging state of the high voltage battery 194.

(6) Second Embodiment

The following describes a motor driving apparatus with a multiple power source system incorporated therein as a second embodiment according to the present invention. The motor driving apparatus of the second embodiment is mounted on the hybrid vehicle shown in FIG. 1. The structure of the second embodiment is similar to that of the first embodiment, except the following two points:

(1) a fuel cell stack 384 (see FIG. 8) is provided, in place of the low voltage battery 184; and (2) the control unit 190 carries out a different control procedure.

The structure of the electric circuit in the second embodiment is not specifically illustrated here. In the second embodiment, the output voltage of the fuel cell stack 384 is set to be lower than the output voltage of the high voltage battery 194. The electric current accordingly does not flow from the fuel cell stack 384 into the high voltage battery 194 through the flywheel diodes D1 through D6.

Figure 6:
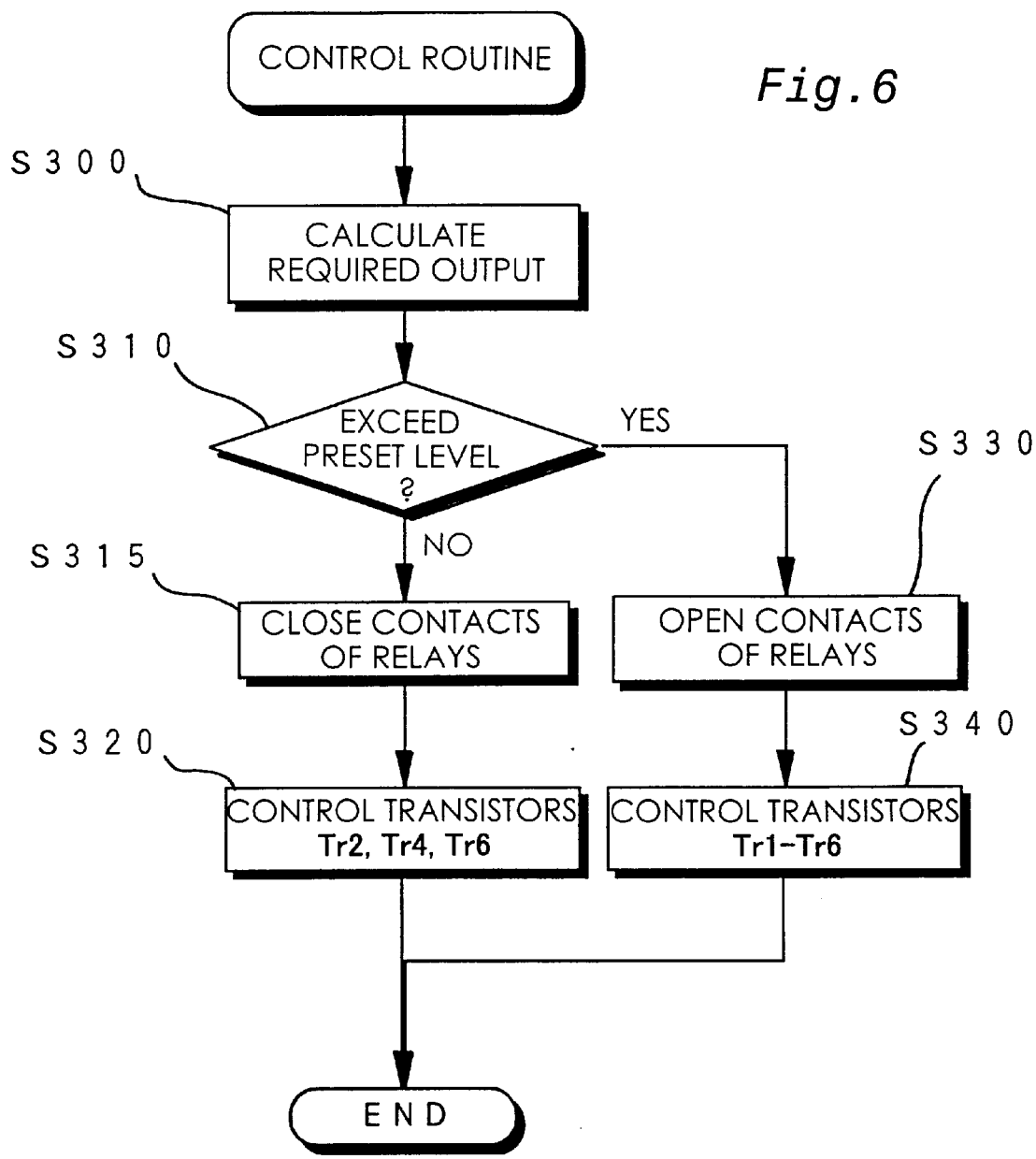
FIG. 6 is a flowchart showing a control routine executed by the control unit in a second embodiment according to the present invention.
Figure 7:
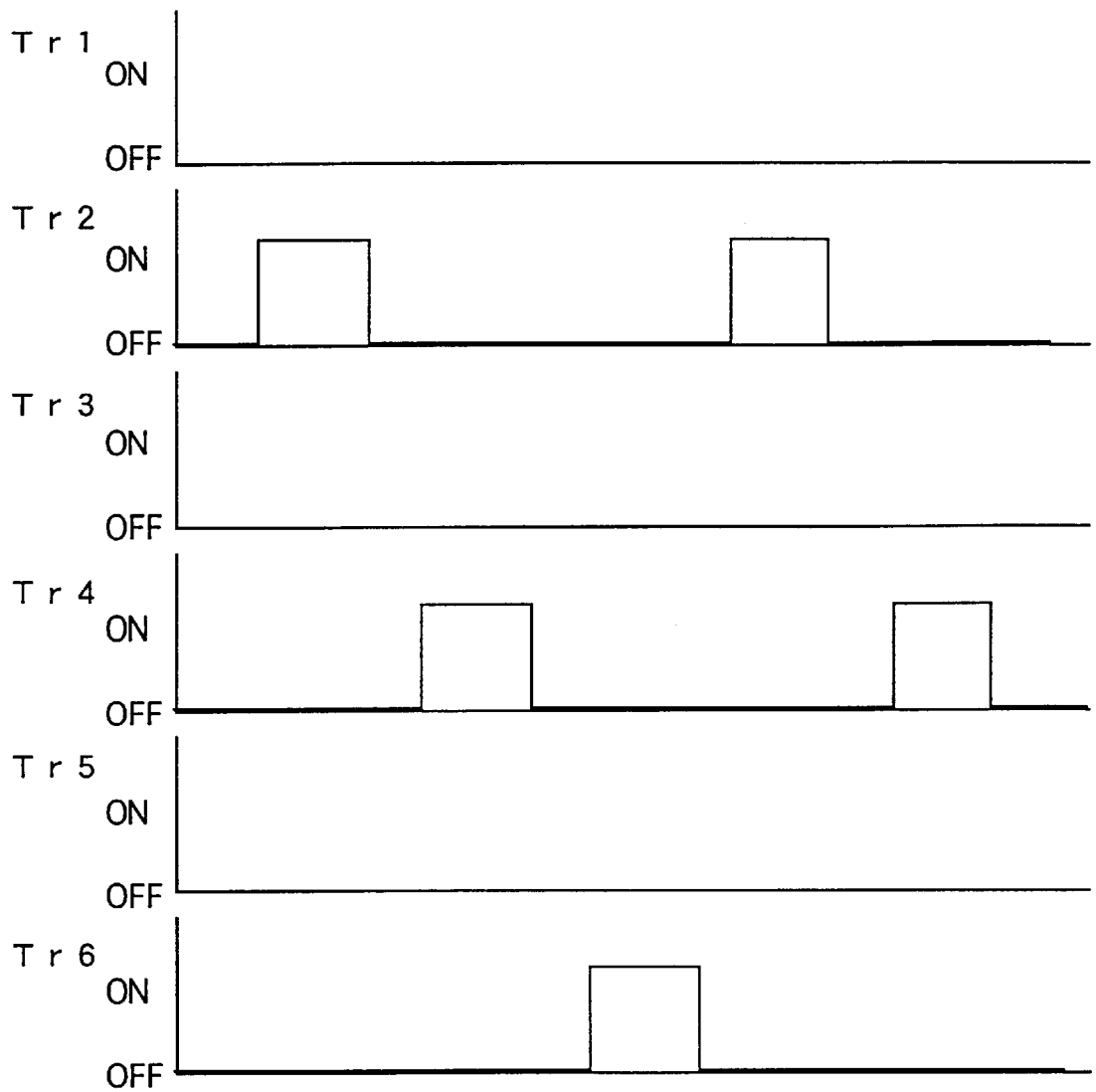
FIG. 7 is a timing chart showing operations of the respective transistors in the process of unipolar control.

FIG. 6 is a flowchart showing a control routine executed by the control unit 190 in the second embodiment. The control routine is carried out while the hybrid vehicle drives in a steady state. The program first calculates a required output to the vehicle, for example, from the observed step-on amount of an accelerator pedal (not shown) and the observed vehicle speed at step S300. When it is determined at step S310 that the calculated required output is not greater than a preset level, the program closes the contacts of the relays 21 and 22 at step S315 and carries out a unipolar control to successively turn on the transistors Tr2, Tr4, and Tr6 at step S320. The timing chart of FIG. 7 shows the on-off state of the respective transistors Tr1 through Tr6 to control the electric currents flowing through the windings of the respective phases U, V, and W in the first motor MG1 in the process of the unipolar control. In this case, the transistors Tr1, Tr3, and Tr5 are kept in OFF position, so that the electric current does not flow from the high voltage battery 194 into the respective phase coils. The first motor MG1 is accordingly driven only with the electric power output from the fuel cell stack 384. The on-time of each transistor is determined by the PWM control, so as to enable the torque corresponding to the required output to be output from the motor MG1.

When it is determined at step S310 that the calculated required output to the vehicle exceeds the preset level, on the other hand, the program opens the contacts of the relays 21 and 22 at step S330 and carries out a bipolar control using all the transistors Tr1 through Tr6 to drive the motor MG1 at step S340. The axle 112 is accordingly rotated with the high electric power output from the high voltage battery 194.

Figure 8:
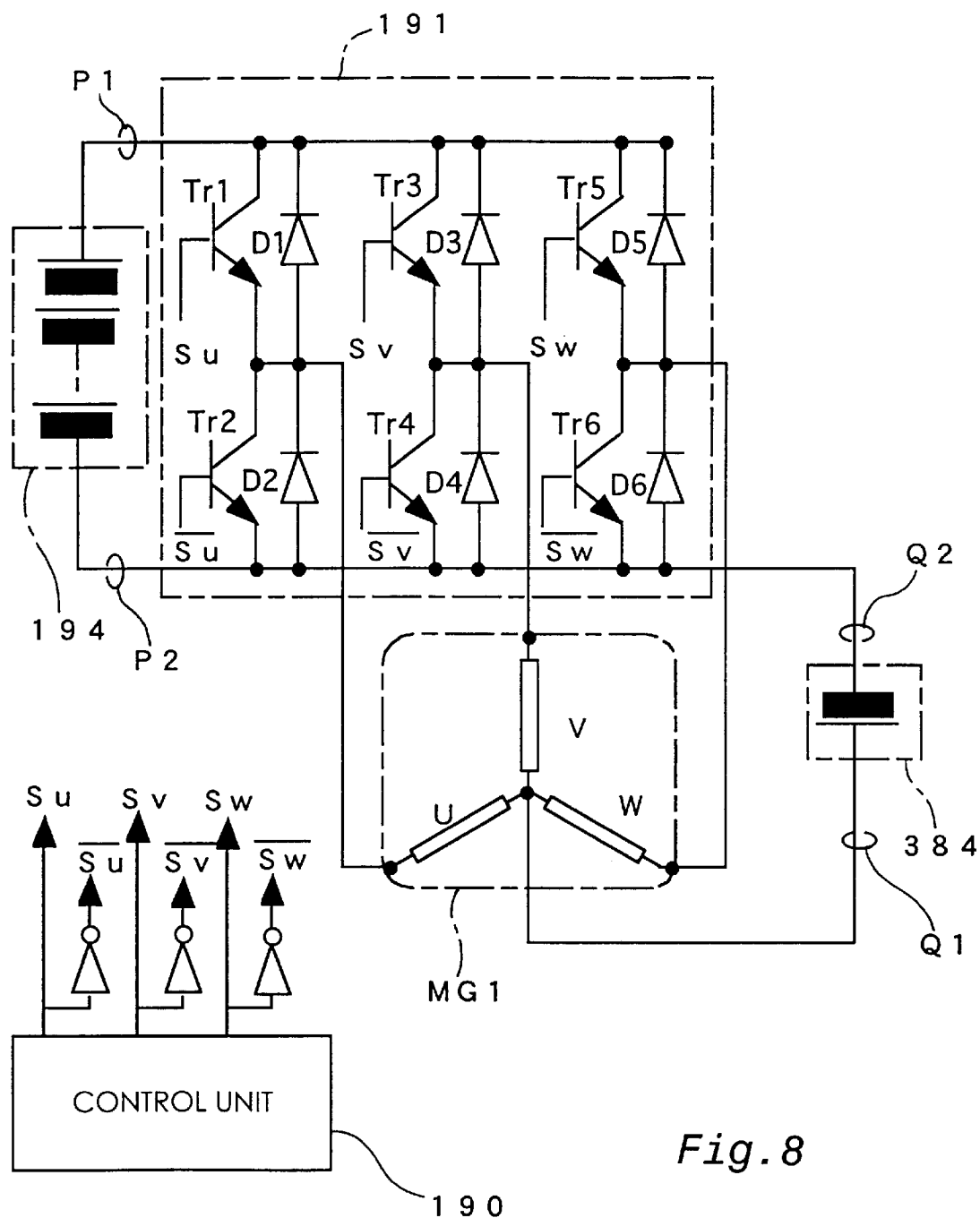
FIG. 8 is a circuit diagram showing a modified structure of connecting a fuel cell stack without using contacts of relays.

The arrangement of the second embodiment enables the fuel cell stack 384 and the high voltage battery 194 to be readily connected to the motor MG1. The driving power source of the motor MG1 is thus appropriately switched between the fuel cell stack 384 and the high voltage battery 194. The structure of the second embodiment uses the relays 21 and 22. As shown in FIG. 8, however, the fuel cell stack 384 may be connected directly with the neutral point of the windings of the motor MG1 without using the relays 21 and 22. In this case, the output voltage of the fuel cell stack 384 is set to be approximately half the voltage of the high voltage battery 194. The voltage at the neutral point of the motor MG1 connected with the fuel cell stack 384 becomes substantially equal to the voltage of the fuel cell stack 384. The fuel cell stack 384 accordingly does not interfere with the high voltage battery 194 while the motor MG1 is driven by the high voltage battery 194. In the case where the output of the fuel cell stack 384 is higher than the output voltage of the high voltage battery 194, the high voltage battery 194 is exchanged with the fuel cell stack 384.

In the second embodiment discussed above, the fuel cell stack 384 is used as the second direct current power source of the present invention. A high voltage battery or a high-power capacitor may alternatively be used as the second direct current power source. In this case, the second direct current power source may be used to drive the motor MG1 and start the engine 150. The second direct current power source may also be used to drive the motor MG1 in the emergency limp state.

The first and the second embodiments regard the parallel hybrid vehicle of the mechanical distribution type using the planetary gear unit 120. The multiple power source system of the present invention is also applicable to a hybrid vehicle of the electrical distribution type that distributes the power by means of a two-rotor clutch motor, as well as to a series hybrid vehicle. The multiple power source system is further applicable to an electric vehicle that does not have any heat engine like a gasoline engine. The series hybrid vehicle converts the power output from the engine to electric energy and causes the drive wheels to be driven only with the power output from the motor.

As described above, in the multiple power source system of the present invention, the plurality of direct current power sources having different potentials are connected to the three-phase motor by a simple arrangement of connection. This favorably prevents the whole system from being made bulky. This simple arrangement of connection is applicable to the charge circuit from the second direct current power source to the first direct current power source. This application advantageously enables the electric energy to be supplied from an electric system of a certain potential to another electric system of a different potential without using any separate voltage step-up circuit and voltage step-down circuit in a variety of industrial apparatuses. This simple arrangement of connection is also applicable to the drive circuit that unipolar drives the three-phase motor by means of the second direct current power source. This application enables the motor to be readily driven with the second direct current power source in a variety of industrial apparatuses. The arrangement of connection may also be applied to a starter unit of a vehicle using a high-power capacitor to construct a circuit for carrying out the initial charge of the high-power capacitor. A voltage step-up circuit may be formed by utilizing an inverter-motor circuit of a power-driven air conditioner, in order to carry out the initial charge of the high-power capacitor. The motor for driving the vehicle is not restricted to the first motor MG1, but the second motor MG2 may be used as the reactance. Another application uses not only the inverter circuit of the motor for driving the vehicle but the inverter circuit for the power-driven air conditioner. In this case, the coils of the motor that drives the compressor of the power-driven air conditioner may be used as the reactance. The multiple power source system of the present invention is not restricted to the vehicle, but may be applicable to general industrial apparatuses, such as machine tools and electric appliances.

The present invention is not restricted to the above embodiments or their modifications, but there may be many other modifications, changes, and alterations without departing from the scope or spirit of the main characteristics of the present invention. For example, the multiple power source system of the present invention is applicable to the structure utilizing the winding of a direct current motor, as well as to the alternating current motor, such as a synchronous machine or an induction machine, and the Y-connection and the Δ-connection of the winding. In the case where a plurality of windings and semiconductor power converter elements are present in an industrial apparatus of interest, multiple voltage step-up and step-down circuits may be laid out in a multi-layer configuration, so as to shorten the charge and discharge time.

The scope and spirit of the present invention are limited only by the terms of the appended claims.

What is claimed is:

1. A multiple power source system that supplies an electric power to a three-phase motor, said three-phase motor having Y-connected windings, said multiple power source system comprising:
a first direct current power source;
a power control circuit that is disposed between said first direct current power source and the Y-connected windings of said three-phase motor and has switching elements, which are switched on and off to supply an electric power output from said first direct current power source to said three-phase motor;
a second direct current power source that is different from said first direct current power source; and
a unit that prevents said first direct current power source from being charged with the electric power output from said second direct current power source while said switching elements are switched off,
wherein one terminal of said second direct current power source is connected with a terminal of said first direct current power source having an identical polarity, and
the other terminal of said second direct current power source is connected with a neutral point of the Y-connected windings in said three-phase motor,
said multiple power source system further comprising:
a charging control unit that controls the switching on and off of said switching elements and uses the windings of said three-phase motor to boost a voltage of said second direct current power source, and charges said first direct current power source with the boosted electric power output, when lack of the power supplied from said first direct current power source is detected, before said first direct current power source drives said three-phase motor.

2. A multiple power source system in accordance with claim 1, wherein said power control circuit comprises a pair of the switching elements that are provided for each of the windings of said three-phase motor and are interposed between a positive power line and a negative power line of said first direct current power source,
each of the switching elements being connected with a protection diode in a reverse direction,
a connection point of each pair of the switching elements being connected to the corresponding winding,
said charge unit switching on a switching element that is selected among the pairs of the switching elements and is included in a closed circuit including said second direct current power source and the corresponding winding, and subsequently turning off the selected switching element, so as to cause said first direct current power source to be charged via said protection diode.

3. A multiple power source system in accordance with claim 1, said multiple power source system further comprising:
a charge sensor that measures a charge level of said first direct current power source by said charge unit; and
a charge control circuit that controls a working condition of said charge unit, based on the observed charge level by said charge sensor.

4. A multiple power source system in accordance with claim 3, wherein said charge control circuit comprises:
a detection unit that detects a charging state of said first direct current power source, based on the observed charge level by said charge sensor; and
a working condition determination unit that determines the working condition of said charge unit, based on a result of the detection by said detection unit.

5. A multiple power source system in accordance with claim 1, said multiple power source system further comprising:
a connection switching unit that switches a connection of a circuit including said second direct current power source and the neutral point of the Y-connected windings between a substantially closed state and an open state; and
a connection control unit that, when said charge unit starts working, drives said connection switching unit to set the connection of the circuit including said second direct current power source and the neutral point of the Y-connected windings in the substantially closed state.

6. A multiple power source system in accordance with claim 1, wherein said first direct current power source is a battery.

7. A multiple power source system in accordance with claim 1, wherein said first direct current power source is a high-power capacitor.

8. A multiple power source system that supplies an electric power to a three-phase motor, said three-phase motor having Δ-connected windings, said multiple power source system comprising:
a first direct current power source that is chargeable;
a power control circuit that is disposed between said first direct current power source and the Δ-connected windings of said three-phase motor and has switching elements, which are switched on and off to supply an electric power output from said first direct current power source to said three-phase motor;
a second direct current power source outputting the voltage that is lower than that of said first direct current power source, and a unit that prevents the first direct current power source from being charged with electric power output from said second direct current power source while said switching elements are switched off wherein one terminal of said second direct current power source is connected with a terminal of said first direct current power source having an identical polarity, and the other terminal of said second direct current power source is connected to one terminal of the Δ-connected windings in said three-phase motor; and a charge unit that controls switch-on and -off operations of a specific switching element that is connected to a specific winding, to which one terminal of said second direct current power source is not directly connected, in order to step up a voltage using the specific winding of said three-phase motor when a lack of power supplied from said first direct current power source is detected, before said first direct current power source drives said three phase-phase motor, thereby causing said first direct current power source to be charged with an electric power output from said second direct current power source.

9. An apparatus comprising an engine that is directly driven by means of a fuel and outputs a power to an output shaft, a three-phase motor that is connected with said output shaft of said engine and has Y-connected windings, and a multiple power source system that supplies an electric power to said three-phase motor, said multiple power source system comprising:

a first direct current power source that outputs an electric power for driving said three-phase motor;

a power control circuit that is disposed between said first direct current power source and the Y-connected windings of said three-phase motor and has switching elements, which are switched on and off to supply the electric power output from said first direct current power source to said three-phase motor; and a second direct current power source that is different from said first direct current power source and is used to control said apparatus, wherein one terminal of said second direct current power source is connected with a terminal of said first direct current power source having an identical polarity, and the other terminal of said second direct current power source is connected with a neutral point of the Y-connected windings in said three-phase motor, said apparatus further comprising:

a start control unit that drives said three-phase motor to start said engine; and a start-time charge unit that, when a remaining charge of said first direct current power source is insufficient for driving said three-phase motor to start said engine, controls switching-on and -off operations of a specific switching element, which is connected to a specific winding selected among the Y-connected windings of said three-phase motor, at a time of starting said three-phase motor, in order to step up a voltage using the specific winding, thereby causing said first direct current power source to be charged with an electric power output from said second direct current power source.

10. An apparatus in accordance with claim 9, wherein said engine is an internal combustion engine, and said apparatus is a hybrid vehicle that drives with at least either one of a power output from said internal combustion engine and a power output from said three-phase motor.

11. A vehicle comprising a three-phase motor that drives a compressor of an air conditioner and has Y-connected windings, and a multiple power source system that functions as a power source of said three-phase motor, said multiple power source system comprising:

a first direct current power source that is a high-power capacitor to drive said three-phase motor;

a power control circuit that is disposed between said first direct current power source and the Y-connected windings of said three-phase motor and has switching elements, which are switched on and of f to supply an electric power output from said first direct current power source to said three-phase motor; and a second direct current power source that is used to control said vehicle, wherein one terminal of said second direct current power source is connected with a terminal of said first direct current power source having an identical polarity, and the other terminal of said second direct current power source is connected with a neutral point of the Y-connected windings in said three-phase motor, said vehicle further comprising:

a start control unit that starts said three-phase motor with an electric charge accumulated in said first direct current power source; and a start-time charge unit that, when the electric charge accumulated in said first direct current power source is insufficient for starting said three-phase motor, controls switching-on and -off operations of a specific switching element, which is connected to a specific winding selected among the Y-connected windings of said three-phase motor, at a time of starting said three-phase motor, in order to step up a voltage using the specific winding, thereby causing said first direct current power source to be charged with an electric power output from said second direct current power source.

12. A motor driving apparatus that drives a three-phase motor with an electric power output from a multiple power source system, said three-phase motor having Y-connected windings, said multiple power source system comprising:

a first direct current power source;

a power control circuit that is disposed between said first direct current power source and the Y-connected windings of said three-phase motor and has switching elements, which are switched on and off to supply an electric power output from said first direct current power source to said three-phase motor; and a second direct current power source that is different from said first direct current power source, wherein one terminal of said second direct current power source is connected with a terminal of said first direct current power source having an identical polarity, and the other terminal of said second direct current power source is connected with a neutral point of the Y-connected windings in said three-phase motor, said motor driving apparatus further comprising:

a first motor drive unit that causes said power control circuit to drive said three-phase motor by means of said first direct current power source; and a second motor drive unit that independently switches on and off the switching elements that are connected to power lines of the connection of said first direct current power source with said second direct current power source, and unipolar driving said three-phase motor by means of said second direct current power source.

13. A motor driving apparatus in accordance with claim 12, wherein said power control circuit comprises a pair of the switching elements that are provided for each of the windings of said three-phase motor and are interposed between a positive power line and a negative power line of said first direct current power source, a connection point of each pair of the switching elements being connected to the corresponding winding, said second motor drive unit successively switching on and off one of each pair of the switched elements to form a closed circuit including said second direct current power source and the corresponding winding, thereby generating a field in said three-phase motor.

14. A motor driving apparatus that drives a three-phase motor with an electric power output from a multiple power source system, said three-phase motor having Δ-connected windings, said multiple power source system comprising:

a first direct current power source;

a power control circuit that is disposed between said first direct current power source and the Δ-connected windings of said three-phase motor and has switching elements, which are switched on and off to supply an electric power output from said first direct current power source to said three-phase motor; and a second direct current power source that is different from said first direct current power source, wherein one terminal of said second direct current power source is connected with a terminal of said first direct current power source having an identical polarity, and the other terminal of said second direct current power source is connected with one terminal of the Δ-connected windings, said motor driving apparatus further comprising:

a first motor drive unit that causes said power control circuit to drive said three-phase motor by means of said first direct current power source; and a second motor drive unit that independently switches on and off switching elements, to which the other terminal of said second direct current power source is not directly connected, among the switching elements that are connected to power lines of the connection of said first direct current power source with said second direct current power source, and irregular unipolar driving said three-phase motor by means of said second direct current power source.

15. A hybrid vehicle comprising an engine that is mounted thereon and directly driven with a fuel, a three-phase motor that works as a power source to drive said hybrid vehicle, a multiple power source system that supplies an electric power to said three-phase motor, and a motor driving apparatus that drives said three-phase motor, said three-phase motor having Y-connected windings, said multiple power source system comprising:

a first direct current power source;

a power control circuit that is disposed between said first direct current power source and the Y-connected windings of said three-phase motor and has switching elements, which are switched on and off to supply an electric power output from said first direct current power source to said three-phase motor; and a second direct current power source that is different from said first direct current power source, wherein one terminal of said second direct current power source is connected with a terminal of said first direct current power source having an identical polarity, and the other terminal of said second direct current power source is connected with a neutral point of the Y-connected windings in said three-phase motor, said motor driving apparatus comprising:

a first motor drive unit that causes said power control circuit to drive said three-phase motor by means of said first direct current power source; and a second motor drive unit that independently switches on and off the switching elements that are connected to power lines of the connection of said first direct current power source with said second direct current power source, and unipolar driving said three-phase motor by means of said second direct current power source, said three-phase motor being connected with either one of a drive shaft of said hybrid vehicle and a rotating shaft of said engine, said drive shaft being driven according to a driving state of said hybrid vehicle with at least one of a power output from said engine and a power output from said three-phase motor.

* * * * *